United States Patent
Kalantri et al.

(10) Patent No.: US 7,853,839 B2
(45) Date of Patent: Dec. 14, 2010

(54) METHOD AND APPARATUS FOR VERIFYING THE CORRECTNESS OF FTAP DATA PACKETS RECEIVED ON THE FLO WAVEFORM

(75) Inventors: Sacchindrakumar Gopikisan Kalantri, San Diego, CA (US); Jake Levi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 11/398,179

(22) Filed: Apr. 4, 2006

(65) Prior Publication Data

US 2007/0234139 A1 Oct. 4, 2007

(51) Int. Cl.
*G01R 31/28* (2006.01)
(52) U.S. Cl. .................. 714/712; 714/732; 714/736
(58) Field of Classification Search ........... 714/712, 714/715, 736, 819, 738, 744, 707, 776, 798, 714/732, 701, 45, 781; 370/329; 455/67.11, 455/115.1; 709/248
See application file for complete search history.

(56) References Cited

U.S. PATENT DOCUMENTS

| | | | | |
|---|---|---|---|---|
| 4,433,413 A | * | 2/1984 | Fasang | 714/732 |
| 5,515,383 A | * | 5/1996 | Katoozi | 714/732 |
| 5,583,849 A | * | 12/1996 | Ziemann et al. | 370/397 |
| 5,701,427 A | * | 12/1997 | Lathrop | 709/237 |
| 6,161,198 A | * | 12/2000 | Hill et al. | 714/15 |
| 6,542,538 B2 | | 4/2003 | Fischel et al. | |
| 6,687,499 B1 | * | 2/2004 | Numminen et al. | 455/423 |
| 6,859,456 B1 | * | 2/2005 | Hetherington et al. | 370/394 |
| 7,111,139 B2 | * | 9/2006 | Osaki | 711/162 |
| 7,222,159 B2 | * | 5/2007 | Miller et al. | 709/206 |
| 2007/0230581 A1 | | 10/2007 | Orr | |
| 2008/0010342 A1 | * | 1/2008 | Gebhardt et al. | 709/204 |

FOREIGN PATENT DOCUMENTS

WO WO2007115274 A1 10/2007

OTHER PUBLICATIONS

International Search Report - PCT/US07/065812 - ISA - EPO - Sep. 17, 2007.
Written Opinion - PCT/US07/065812 - ISA - EPO - Sep. 17, 2007.
Shalunov et al., "A One-Way Active Measurement Protocol (OWAMP)", IETF Standard-Working-Draft, Internet Engineering Task Force, IETF, CH, vol. IPPM, No. 16, Feb. 2006, pp. 1-56.
TIA-1104, "Test Application Protocol For Terrestrial Mobile Multimedia Multicast Forward Link Only Transmitters and Devices", Dec. 2006, pp. 1-1-3-2.

* cited by examiner

*Primary Examiner*—Phung M Chung
(74) *Attorney, Agent, or Firm*—Gerald P. Joyce, III

(57) ABSTRACT

Systems and methodologies are described that facilitate verifying correctness of FLO test application protocol (FTAP) data packets. According to various aspects, systems and/or methods are described that enable generating an expected test signature at an FTA client (e.g., mobile device), receiving FTAP flow data packets and/or effectuating comparisons between received and expected data. Such systems and/or methods may further resynchronize client-side generation to an FTA server.

74 Claims, 12 Drawing Sheets

METHOD AND APPARATUS FOR VERIFYING THE CORRECTNESS OF FTAP DATA PACKETS RECEIVED ON THE FLO WAVEFORM

BACKGROUND

I. Field

The following description relates generally to wireless communications, and more particularly to resynchronizing test signatures based at least in part upon a comparison between a received test sequence number and a retained test sequence number at a client device.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Recently, broadcast techniques such as Forward Link Only (FLO) technology have been developed and employed to provide content (e.g., video, audio, multimedia, IP datacast, . . . ) to portable user device(s). FLO technology can be designed to achieve high quality reception, both for real-time content streaming and other data services. FLO technology can provide robust mobile performance and high capacity without compromising power consumption. In addition, FLO technology may reduce costs associated with delivering multimedia content by decreasing the number of deployed base station transmitters. Furthermore, FLO technology based multimedia multicasting can be complimentary to wireless operators' cellular network data and voice services, delivering content to the same mobile devices.

As with other communications protocols, FLO technology is associated with a testing protocol, such that device minimum performance tests can be undertaken in a factory/lab/field environment. This testing protocol can be referred to as a FLO Test Application Protocol (FTAP). FTAP defines a set of procedures that, when implemented by both the network and the device, can be used for the device minimum performance tests in a factory/lab/field environment. FTAP flows can be configured and activated within a network to test specific device behaviors. In one example, an FTAP flow can include a series of data packets, wherein each packet spans one packet layer protocol (PLP). The packets can include information such as a test sequence number, a test signature, and a test data pattern.

FTAP flows can be employed to verify a physical layer of a communications protocol (e.g., Orthogonal Frequency Division Multiplexing (OFDM)) by ensuring that data received by a device is consistent with data provided by a network. Such verification is problematic, however, in that it is difficult to verify the physical layer in a FLO system in real-time. For example, data generated at the network can be collected and compared with data received and collected from the device, wherein such comparison takes place offline. More particularly, sequence numbers and test signatures sent by the network can be compared with sequence numbers and test signatures received by the device, and such information can be collected and compared offline. While this may provide an accurate measure of correctness of received data, it does not provide any real-time analysis with respect to such data.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

In accordance with one or more embodiments and corresponding disclosure thereof, various aspects are described in connection with verifying correctness of FLO test application protocol (FTAP) data packets. According to various aspects, systems and/or methods are described that enable generating an expected test signature at an FTA client (e.g., mobile device), receiving FTAP flow data packets and/or effectuating comparisons between received and expected data. Such systems and/or methods may further resynchronize client-side generation to an FTA server.

With respect to an aspect described herein, a method that facilitates verifying correctness of received FLO test application protocol (FTAP) data packets is disclosed. The method can include generating an expected test signature based upon a start sequence number and a start signature offset and obtaining flow data including a received test signature and corresponding sequence number. The method can additionally include comparing the received sequence number and a retained sequence number as well as resynchronizing the expected test signature based upon the comparison of the received sequence number and the retained sequence number.

Another aspect disclosed herein relates to a wireless communications apparatus, wherein such apparatus can comprise a memory that retains a test sequence number received from a network server. The apparatus can additionally comprise a processor that compares the retained test sequence number with a received test sequence number and resynchronizes an expected test signature based at least in part upon the comparison.

In accordance with yet another aspect, a machine-readable medium is contemplated, wherein the machine-readable medium has instructions stored thereon for receiving a test sequence number that correlates to a test signature, determining whether the test signature that correlates to the received test sequence number corresponds to an expected test signature, and resynchronizing the expected test signature if the expected test signature and the received test signature do not correspond.

In accordance with still another aspect, a wireless communications apparatus is described, wherein the wireless communications apparatus includes means for generating an expected test signature based upon a start sequence number and a start signature offset and means for obtaining flow data including a received test signature and corresponding sequence number. The apparatus can also include means for comparing the received sequence number and a retained sequence number and means for resynchronizing the expected test signature based upon the comparison of the received sequence number and the retained sequence number.

With respect to yet another aspect, described herein is a processor that executes instructions for comparing a received test sequence number within an FTAP flow data packet with a retained test sequence number within the FTAP flow data packet, wherein the received test sequence number and the retained test sequence number correspond to test signatures. The processor can also execute instructions for resynchronizing an expected test signature at a client device based at least in part upon the comparison.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
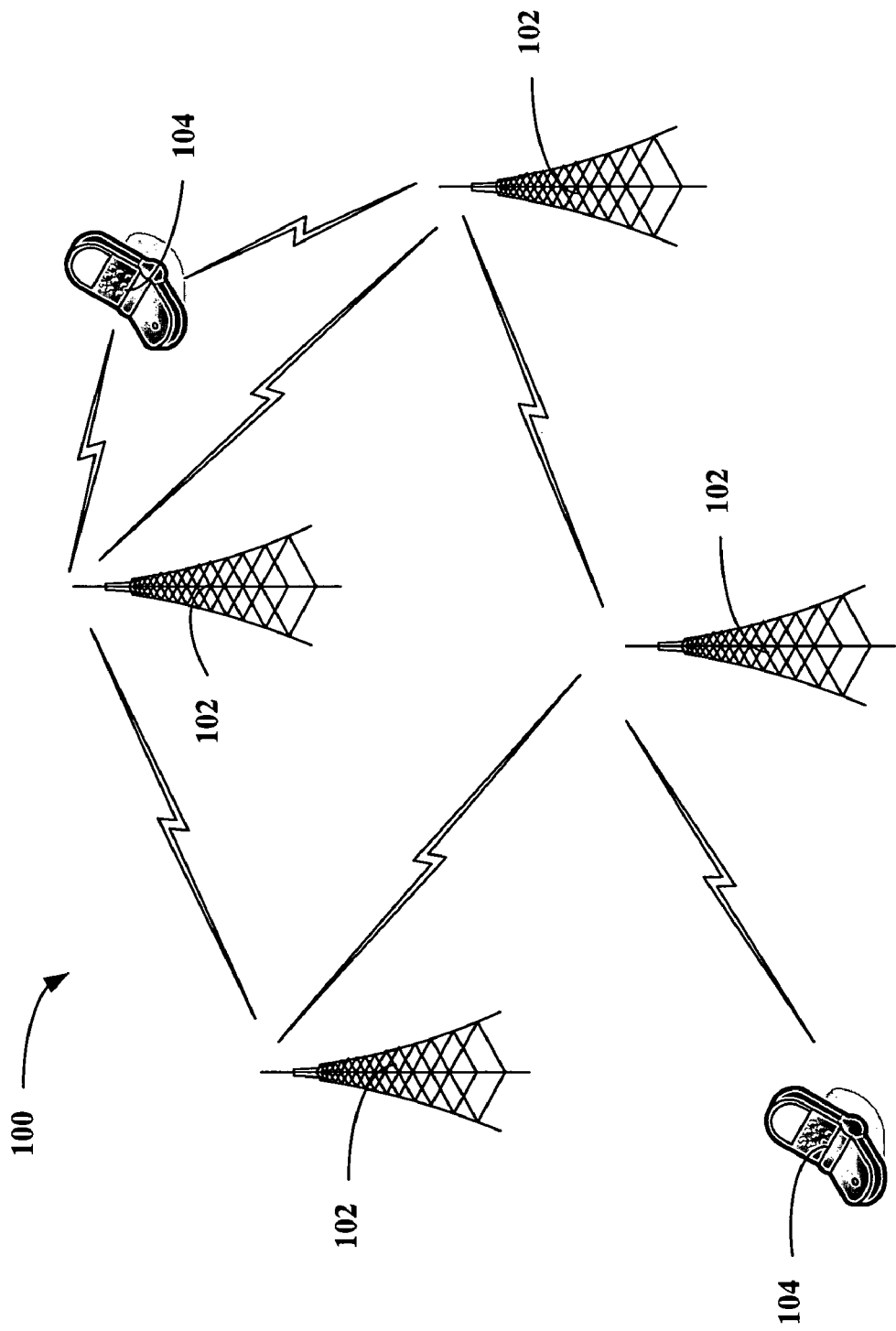
FIG. 1 is an illustration of a wireless communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of what is described herein.

A FLO wireless system can be designed to broadcast real time audio and video signals, as well as non-real time services. The respective FLO transmission is carried out utilizing tall, high power transmitters to ensure wide coverage in a given geographical area. It is common to deploy multiple transmitters in certain regions to ensure that the FLO signal reaches a significant portion of the population in a given area. Typically, FLO technology utilizes Orthogonal Frequency Division Multiplexing (OFDM). It is to be understood, however, that the claimed subject matter is applicable to various communications protocols (wireless or wirelined).

Frequency division based techniques, such as OFDM, typically separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation or, for digital service, digital data. Each channel can be assigned to only one user device or terminal at a time. OFDM effectively partitions the overall system bandwidth into multiple orthogonal frequency channels. An OFDM system may use time and/or frequency division multiplexing to achieve orthogonality among multiple data transmissions for several terminals. For example, different terminals may be allocated different channels, and the data transmission for each terminal may be sent on the channel(s) allocated to such terminal. By using disjoint or non-overlapping channels for different terminals, interference among multiple terminals may be avoided or reduced, and improved performance may be achieved.

Testing performance of communications between base stations and devices in a FLO system is imperative to effectuate consistent and reliable communications within a coverage area. In one particular example, it is important to perform physical layer verification to ensure that FTAP data received by a mobile device is consistent with data sent to such device by the network. Moreover, it is desirable to verify test data on the mobile device itself, thereby enabling real-time reporting and analysis of communications system performance.

Referring now to FIG. 1, a wireless communication system 100 is illustrated in accordance with various embodiments presented herein. System 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Base stations 102 can broadcast content to mobile devices 104 by employing Forward Link Only (FLO) technology. For instance, real time audio and/or video signals may be broadcast, as well as non-real time services (e.g., music, weather, news summaries, traffic, financial information, . . . ). According to an example, content may be broadcast by base stations 102 to mobile devices 104. Mobile devices 104 may receive and output such content (e.g., by employing visual output(s), audio output(s), . . . ). Moreover, FLO technology may utilize orthogonal frequency division multiplexing (OFDM). Frequency division based techniques such as OFDM typically separate the frequency spectrum into distinct channels; for instance, the frequency spectrum may be split into uniform chunks of bandwidth. OFDM effectively partitions the overall system bandwidth into multiple orthogonal frequency channels. Additionally, an OFDM system may use time and/or frequency division multiplexing to achieve orthogonality among multiple data transmissions for multiple base stations 102.

In FLO systems, it is desirable to ensure that the mobile devices 104 are properly receiving data provided by the base stations 102. To that end, and as described in more detail below, the FLO Test Application Protocol (FTAP) can be employed to verify the physical layer of system 100. In other words, FTAP can be employed to ensure that the mobile devices 104 are receiving data from the base stations 102 properly. FTAP defines a set of procedures that, when implemented by both a network and the mobile devices 104, can be used for minimum performance tests with respect to the device. To that end, FTAP flows (a series of FTAP packets) can be configured and activated within a network to test specific device behaviors. Pursuant to one example, each FTP packet can carry information such as a test sequence number, a test signature, and a test data pattern. The sequence number can be a 32 bit integer that is derived from a 32 bit counter, wherein the counter can be initialized to any suitable value. It is understood, however, that the sequence number can be of any suitable number of bits, and the counter can be a counter of any suitable number of bits. The test signature can be an eight bit pseudo random integer derived from a circular buffer of bits generated through use of a particular polynomial, such as $p(x)=x^{15}+x+1$ and a 15-state Simple Shift Register Generator (SSRG). Again, however, the polynomial and the Simple Shift Register Generator can differ, and it is understood that suitable variances from the SSRG and the polynomial are contemplated and intended to fall under the scope of the hereto-appended claims.

Verification of data that accords to FTAP can be performed on the mobile devices 104. For example, if test data is generated using a well known algorithm, then the mobile devices 104 can implement a substantially similar algorithm to verify whether the received data is correct. Verification performed on the mobile devices is fairly simple and enables real-time reporting (e.g., the mobile devices 104 can report errors over a 1x link or any other suitable link). To enable this verification, the mobile devices 104 should know a state of the FTAP flows. Furthermore, the devices 104 should account for erasures or loss of coverage as well as wraparounds. Solutions to such issues are provided in detail below.

Figure 2:
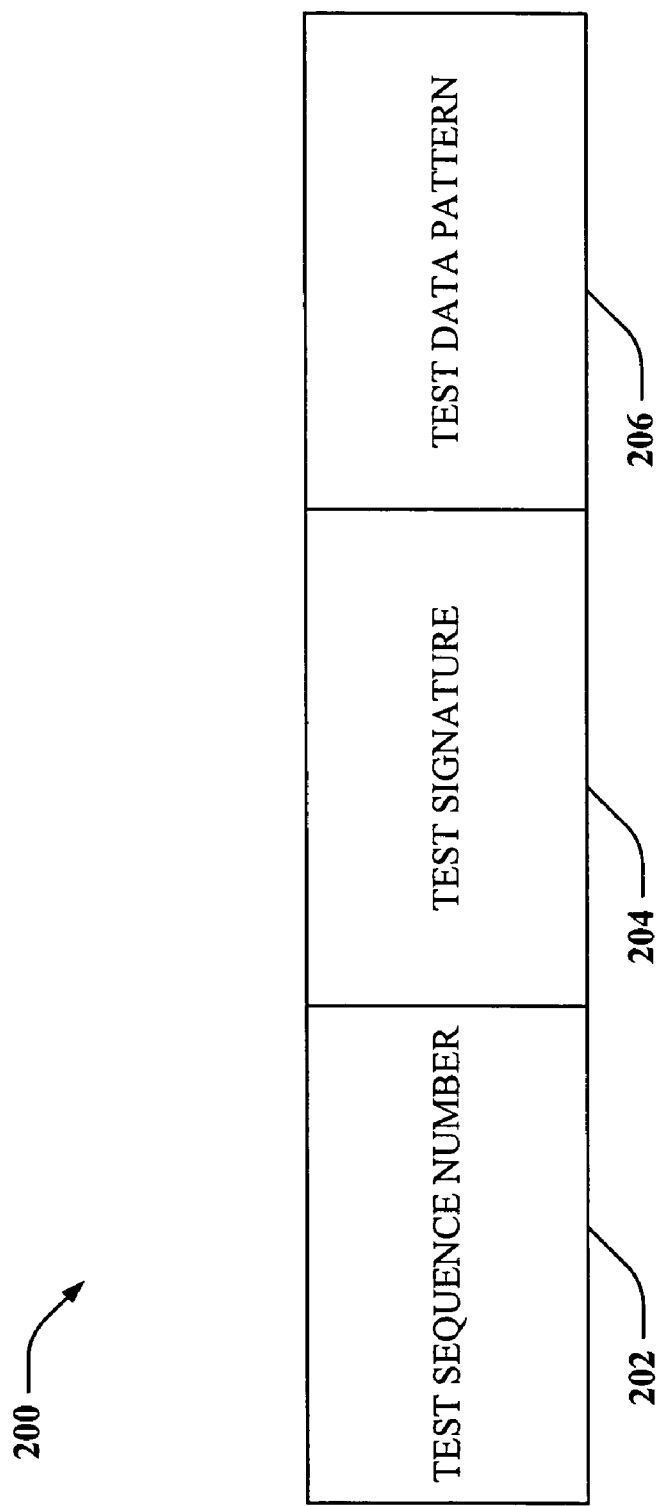
FIG. 2 is an illustration an example FTAP flow data packet.

Now referring to FIG. 2, an example FTAP flow data packet 200 is illustrated. The packet 200 includes a test sequence number 202, which, as stated above, can be a 32 bit integer that is derived from a 32 bit counter that can be initialized to any suitable value. For example, the test sequence number 202 can be provisioned at a network server (herein after referred to as a FLO Test Application Server (FTAS)) as well as at a client device, such that substantially similar values are provisioned on the client device as compared to those provisioned on the FTAS. The test sequence number 202 can be provisioned to any suitable value. Further, the test sequence number 202 can change consecutively as subsequent packets are generated. The FTAP flow data packet 200 can additionally include a test signature 204, which may be an 8 bit pseudo random integer that is derived from a circular buffer of bits generated using a polynomial, such as $p(x)=x^{15}+x+1$, as well as a 15-state SSRG. Other polynomials and SSRGs are contemplated, however. Each test sequence number 204 within an FTAP flow data packet will correspond to a particular test signature. The FTAP flow data packet 200 can also include a test data pattern 206, which can be any suitable pattern defined by an operator. As FTAP data packets are sequentially generated in a FTAP flow, the test sequence number 202 can be incremented and an offset associated with the test signature 204 (from the circular buffer) can be advanced such that it points to a subsequent signature. Thus, an algorithmic correspondence between test sequence number 202 and test signature 204 exists for any FTAP flow.

Figure 3:
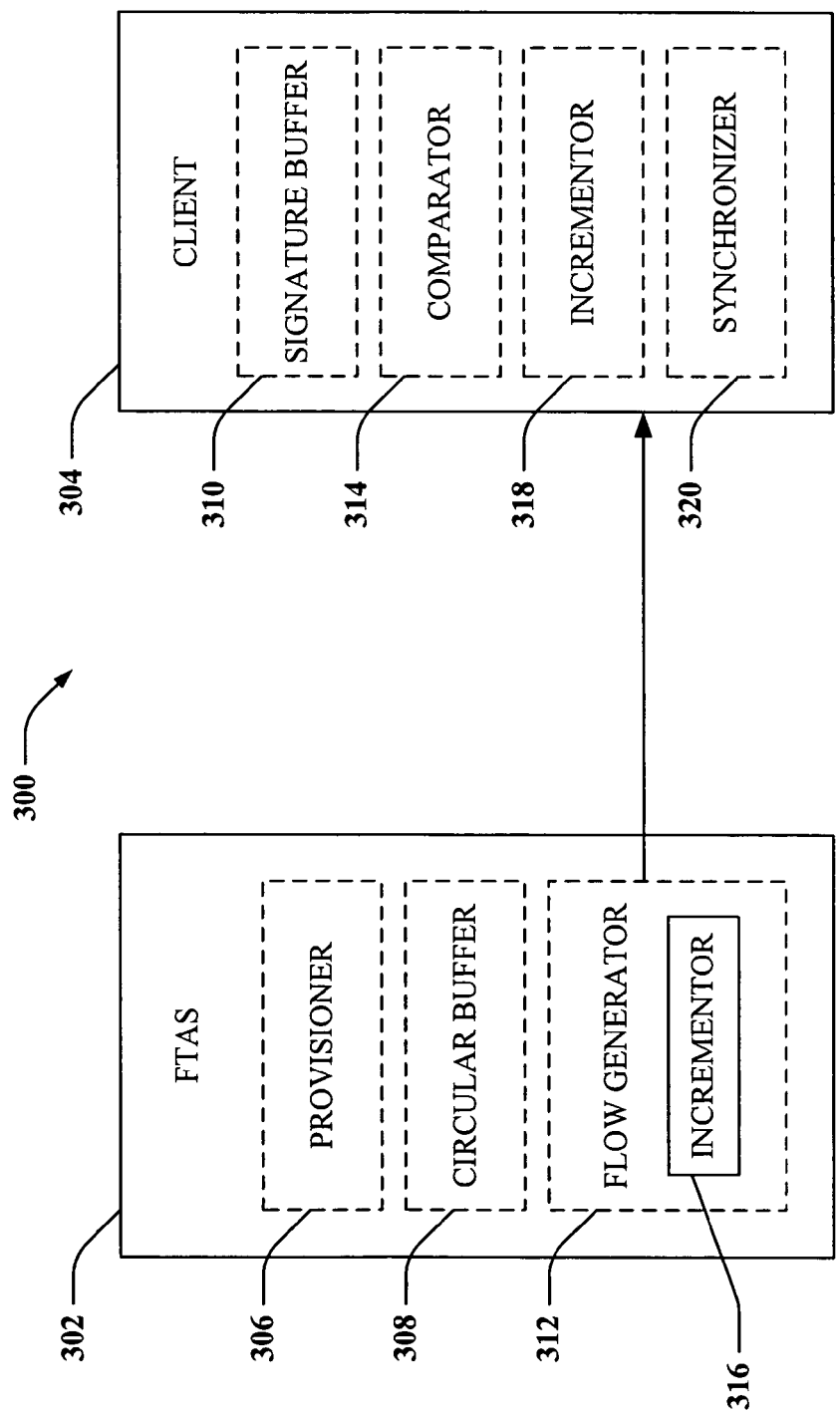
FIG. 3 is an illustration of a system that facilitates verifying correctness of FTAP flow data packets.

Referring now to FIG. 3, a system 300 that facilitates verifying correctness of FTAP flow data packets is illustrated. System 300 includes a network server (FTAS) 302, which is utilized in connection with providing data to a client 304. For example, the data can be voice data, streaming multimedia content (including audio and/or video), and/or any other suitable data. Furthermore, system 300 can be within a FLO system, such that there is a lack of a reverse link between client 304 and FTAS 302. Client 304, however, can communicate with FTAS 302 by way of any wired and/or wireless connection (e.g., 2G, 3G, 4G, broadband, . . . ).

FTAS 302 includes a provisioner 306, which is utilized to provision values for initial test sequence number 202 (FIG. 2) and a test signature offset. To provision the test signature offset, FTAS 302 can include a circular buffer 308 that is utilized to determine which test signature corresponds to the test sequence number. Accordingly, provisioner 306 and circular buffer 308 can act in conjunction to provide an algorithmic correspondence between sequence numbers and test signatures for any FTAP flow.

Client 304 includes a signature buffer 310 that includes substantially similar values that are associated with provisioner 306 and circular buffer 308. Thus, a test sequence number and signature offset value as provisioned on network server 302 will be known at client 304. Such provisioned values can be hard coded into client 304, such as within firmware. In another example, FTAS 302 can provide client 304 with provisioning information and thereafter wait for acknowledgement from client 304 as to receipt of such provisioning information (e.g., values associated with provisioner 306 and circular buffer 308).

FTAS 302 additionally includes a flow generator 312 that outputs FTAP flow data packets in sequence (thereby generating an FTAP flow). Flow generator 312 can initially direct a FTAP flow data packet that includes the values output by provisioner 306 and a test signature corresponding to the offset output by circular buffer 308 to client 304. Client 304 can include a comparator 314 that compares values within a received FTAP flow packet with expected values. More specifically, comparator 314 can ensure that the received FTAP flow data packet includes the test sequence number within signature buffer 310 and a test signature that corresponds to the test signature offset within signature buffer 310 (or other suitable memory). Actions undertaken if such values do not correspond are described in detail below.

Flow generator 312 can include an incrementor 316 that effectuates incrementing the test sequence number and the test signature offset within subsequent FTAP flow data packets. For example, if $SeqNum_{prov}$ is the provisioned test sequence number and $TestSigOffset_{prov}$ is the provisioned test signature offset, then the first FTAP data packet output by flow generator 312 includes [$SeqNum_{prov}$, $TestSigOffset_{prov}$], the next data packet output by flow generator 312 includes [$SeqNum_{prov+1}$, $TestSigOffset_{prov+1}$], and the nth data packet includes data that corresponds to [$SeqNum_{prov+(n-1)}$, $TestSigOffset_{prov+(n-1)}$]. Moreover, a property of a 15 state SSRG is that states repeat after $2^{15}$ combinations. Therefore, the first state is the same as the states 32769, 65537, etc. In other words, the TestSigOffset value for $SeqNum_N$ is substantially similar as that for $SeqNum_{(N+k*32768)}$. Therefore, once signature buffer 310 is initialized with a correct test signature offset, a correlation between a received sequence number and an expected test signature can be established (irrespective of when the FTA flow was activated on FTAS 302 and when client 304 begins decoding flow).

Client 304 also includes an incrementor 318 that increments values in signature buffer 310. Therefore, for example, after client 304 receives and decodes an FTAP flow packet that includes [$SeqNum_{prov}$, $TestSigOffset_{prov}$], incrementor 318 can increment values within signature buffer 310 that client 304 expects associated with a subsequent data packet from FTAS 302. As stated above, once signature buffer 310 is initialized with a correct test signature offset, a correlation between a received sequence number and an expected test signature can be established. The following equation provides a mathematical basis for this correlation:

$$TestSig_{Expected} = TestSig((SeqNum_{Received} - SeqNum_{Prov}) \bmod 2^{15}), \text{ where}$$

$TestSig_{Expected}$ is an expected test signature in the packet, $TestSig_{Received}$ is the received test sequence number in the packet, $SeqNum_{Prov}$ is the number associated with provisioner 306, and TestSig(k) is the test signature buffer at offset k where signature buffer 310 is initialized with test signature offset of $TestSigOffset_{Prov}$.

Another important aspect to note is that, for instance, the test sequence number can be a 32 bit integer that will wrap around after $2^{32}$ values. Since the wraparound interval for the sequence number is an integral multiple of the wraparound interval for a 15 state SSRG, the wraparound of these numbers is inconsequential. As described above, comparator 314 compares expected test sequence numbers with received test sequence numbers. Thus, when client 304 receives an FTA packet (and assuming no erasure), the test sequence number expected ($SeqNum_{Expected}$) in the packet should be one greater than the sequence number received for its previous FTA packet ($SeqNum_{Last}$). In other words:

$$SeqNum_{Expected} = SeqNum_{Last+1}$$

If comparator 314 notices a deviation from such condition, then the received data may be corrupt (if no erasure were reported—this could point to software issues) or client 304 encountered a fade or an area of no coverage and simply missed superframes containing FTA packets. When client 304 returns to coverage, client 304 can again start receiving FTA packets. Comparator 314 will recognize, however, that there is a jump in the received test sequence number. Typically, the jump should be such that the received test sequence number is greater than the expected sequence number. If the test sequence number was wrapped around, however, the received test sequence number may be lower than the expected test sequence number. In any instance, if the received test sequence number is different than the expected test sequence number, a synchronizer 320 can be employed to update the signature buffer 310 and resynchronize FTAS 302 with client 304. For instance, synchronizer 320 can calculate a number of signatures to skip and thereafter skip such number of signatures to arrive at the expected signature. Various manners for calculating a number of signatures to skip are described in detail herein.

Figure 4:
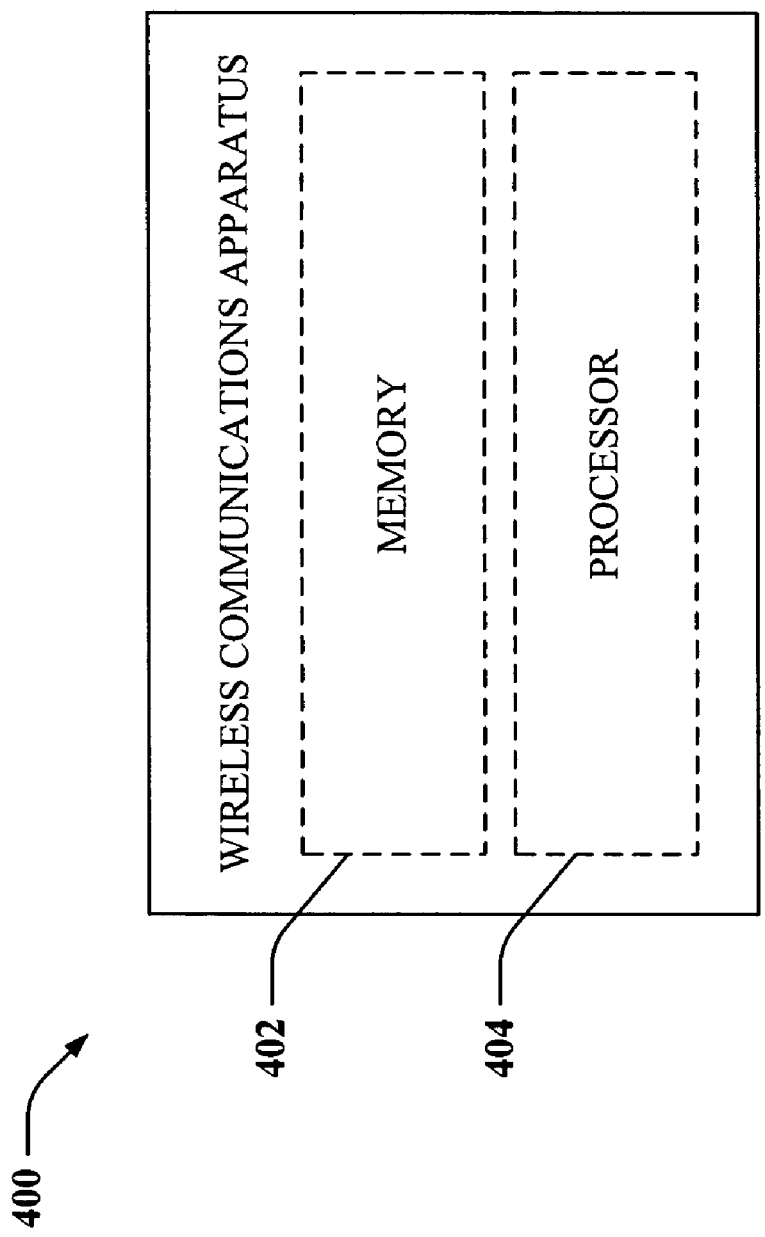
FIG. 4 is an illustration of a wireless communications apparatus that can be utilized in connection with testing a physical layer within a FLO system.

Now turning to FIG. 4, a wireless communications apparatus 400 that can be utilized in connection with testing a physical layer within a FLO system is illustrated. The wireless communications apparatus 400 can be an FTAS or a client or can be resident within an FTAS or client. Wireless communications apparatus 400 can include a memory 402 that can retain provision values, indexes to test signatures, logic utilized to resynchronize a client with the FTAS, and the like. Pursuant to one example, an FTAS can comprise wireless communications apparatus 400, and memory 402 can include provisioning values for test sequence numbers in an initial FTAP flow data packet. Memory 402 can also be employed to retain a test signature offset value, and can be employed in connection with incrementing the test sequence numbers and the test signature offset values.

Wireless communications apparatus 400 can additionally include a processor 404 that can be utilized in connection with creating and sending FTAP flows (a series of FTAP data packets). For example, processor 404 can increment test sequence numbers and signature offset values as FTAP packets are output. Thus, a client device (a mobile device) can expect certain test sequence numbers and corresponding test signatures.

As states above, wireless communications apparatus 400 can also be comprised by a client device. In such an instance, memory 402 can be employed to retain provisioning data, such as values expected with respect to a new FTAP flow (an initial value of a test sequence number and a signature offset value). Memory 402 can additionally include logic that can be employed by processor 404 to compare expected test sequence numbers with received test sequence numbers as well as logic that enables resynchronization of client with an FTAS if an expected test sequence number does not equate to a received test sequence number.

Pursuant to one example, logic employed by processor 404 can relate to determining whether a received test sequence number is equivalent to a last received sequence number (retained within memory 402). If they are equivalent, then an expected test signature number can be equated to the most recently received test signature (e.g., a wraparound has occurred). If they are not equivalent, then the processor 404 can employ logic that compares the received test sequence number with the most recently received test sequence number incremented ($SeqNum_{Last+1}$). If $SeqNum_{Last+1}$ is equal to the received test sequence number, then the expected test signature can be assigned as an increment of the most recently received test signature (TestSig$_{Last+1}$).

Processor 404 can also be employed in connection with causing an expected test signature to skip several increments (in case the client was associated with coverage loss or fading). For instance, if a received test sequence number is greater than SeqNum$_{Last+1}$, then the expected test signature can be assigned the following value: TestSig$_{Last}$+(SeqNum$_{Received}$−SeqNum$_{Last}$). Such value can then be retained within memory 402. If the received test sequence number is not greater than SeqNum$_{Last+1}$, then wraparound has occurred and processor 404 can be employed to resynchronize the expected test signature with a received test signature. In one example, the test sequence number can be a thirty two bit integer. Accordingly, to correct wraparound, a number of increments that should be skipped (and saved in memory 402) can equal $2^{32}$+the received test sequence number less SeqNum$_{Last}$. If the test sequence number is a different integer, then logic utilized by processor 404 (and retained within memory 402) can be adjusted accordingly.

Figure 5:
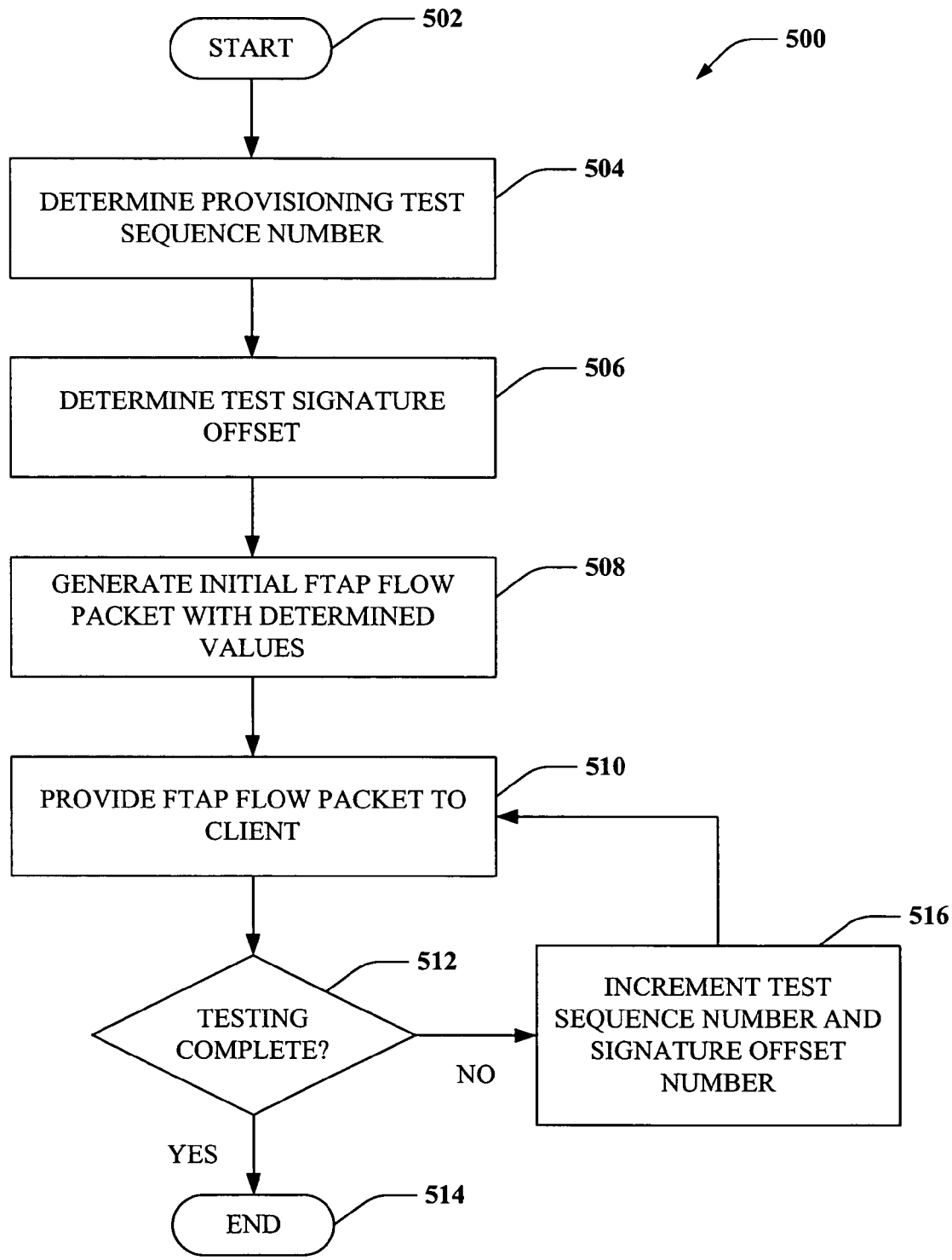
FIG. 5 is an illustration of a methodology for generating an FTAP flow.
Figure 6:
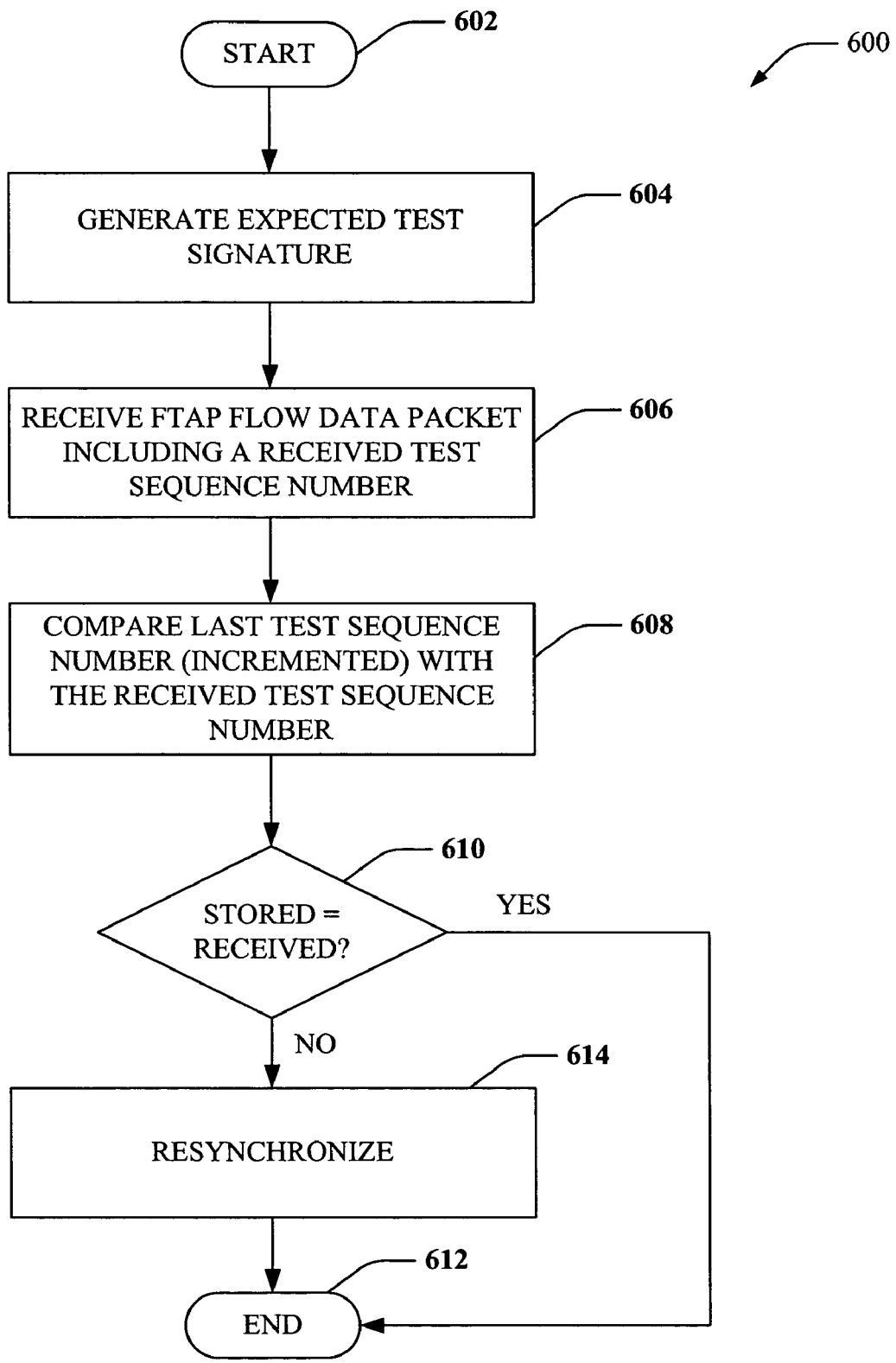
FIG. 6 is an illustration of a methodology that facilitates verifying correctness of received FTAP data packets.
Figure 7:
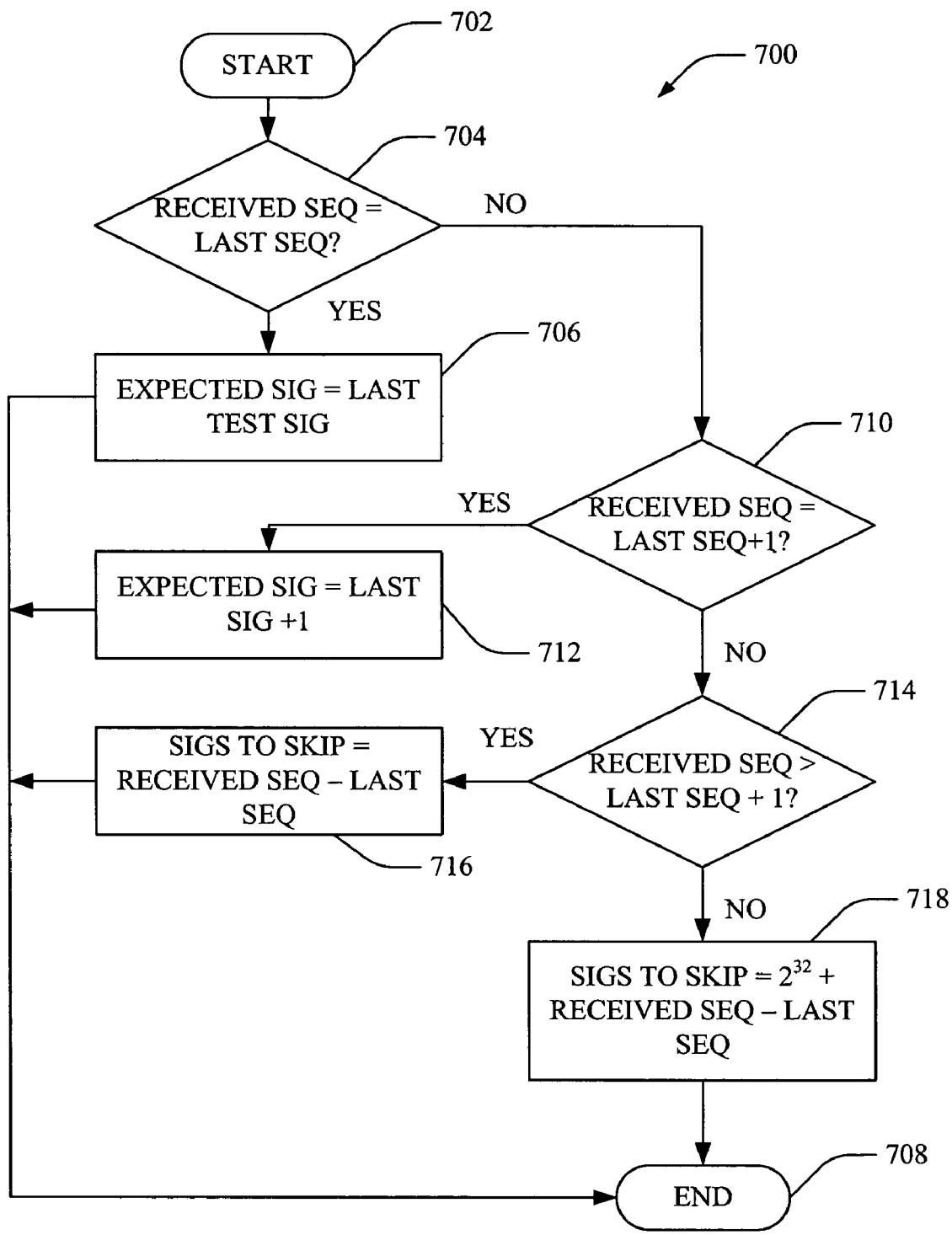
FIG. 7 is an illustration of a methodology for resynchronizing a client with an FTAS with respect to test signatures.

Referring to FIGS. 5-7, methodologies relating to enablement of verifying a physical layer of a FLO system is illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 5, a methodology 500 for generating an FTAP flow is illustrated. The methodology 500 starts at 502, and at 504 a provisioning test sequence number is determined. As described above, FTAP flow data packets include test sequence numbers that are subject to increment as additional packets are generated. The provisioned test sequence number can additionally be known to a client device (a mobile device). At 506, a test signature offset is determined. For example, such offset can be associated with a circular buffer, and can also be known at the client device. The provisioned test sequence number and the test signature offset can create a correlation between the test sequence number and a test signature.

At 508, an initial FTAP flow packet is generated with the values determined at 504 and 506. As stated above, the client can also be aware of such values. At 510, the FTAP flow packet is provided to the client. For instance, such packet can be provided by way of OFDM or any other suitable protocol. Moreover, the FTAP flow data packet can be associated with a FLO system. At 512 a determination is made regarding whether testing is complete. If testing is complete, the methodology 500 completes at 514. Otherwise, the test sequence number and the signature offset number can be incremented at 516, and the FTAP flow packet (with incremented test sequence number and signature offset number) can be provided to the client.

Referring now to FIG. 6, a methodology 600 that facilitates verifying correctness of received FTAP data packets is illustrated. The methodology 600 starts at 602, and at 604 an expected test signature is determined/generated. For example, a test signature offset value can be utilized to index to an expected test signature. The expected test signature can be based at least in part upon a provisioned test sequence number and test signature offset value (that is known both to the FTAS and a client). At 606, an FTAP flow data packet is received, wherein the flow data packet includes a received test sequence number. As described above, the test sequence number can correlate to a test signature offset value. At 608, a last test sequence number (incremented by one) is compared with the received sequence number. More particularly, after the client device receives a test sequence number (last sequence number), the client device can increment such sequence number and store such number in a register. A subsequently received sequence number should then match with the stored value unless fading has occurred, coverage has been lost, or other communications difficulty has occurred.

At 610, a determination is made regarding whether the stored value matches the received test sequence number. As stated above, the test sequence number can be employed in connection with determining an expected test signature. If the stored value and the received test sequence number are equal, then the expected test signature equals the test signature associated with the received FTAP data packet, and the methodology 600 can complete at 612. If the stored value and the received value are not equivalent, then resynchronization can occur at 614. In other words, the stored value and the received test signature can be compared to determine what test signature is associated with the FTAP data packet. An expected test signature can thereafter be updated.

With reference to FIG. 7, a method for resynchronizing a client with an FTAS with respect to test signatures is illustrated. The methodology 700 presupposes that an FTAP flow data packet has been received at a client. The methodology 700 starts at 702, and at 704 a determination is made regarding whether a received test sequence number is equivalent to a last sequence number (a test sequence number stored in memory of the client). If yes, then it can be discerned that wraparound has occurred, and an expected test signature can be updated at 706 to be equivalent to a most recent test signature received at the client. The methodology 700 can then complete at 708.

If the received sequence number is not equivalent to a last sequence number received at the client, then the methodology 700 proceeds to 710, where a determination is made regarding whether the received sequence number is equivalent to a last sequence number that is incremented. If they are equivalent, then an expected signature can be defined as a most recently received/decoded signature that is incremented (e.g., a test signature offset value can be incremented) at 712. The methodology 700 can then complete at 708. If the received sequence number is not equivalent to the last sequence number that has been incremented, then the methodology 700 proceeds to 714.

At 714, a determination is made regarding whether the received sequence number is greater than the last sequence number that has been incremented (associated with an expected test signature). If yes, then at 716 the number of signatures to skip can be defined as the received sequence number minus the last sequence number (not incremented). In this instance, the client may have been associated with fading, causing it to miss some data packets within the FTAP flow. The methodology 700 can then complete at 708. If the received sequence number is not greater than the incremented last sequence number, then at 718 the signatures to skip can be defined as being $2^{32}$+the received sequence number minus the last sequence number. This presupposes that the sequence number is a 32 bit integer, but it is understood that such value can change as system design changes. Act 718 is utilized to correct wraparound. The methodology 700 then completes at 708.

Figure 8:
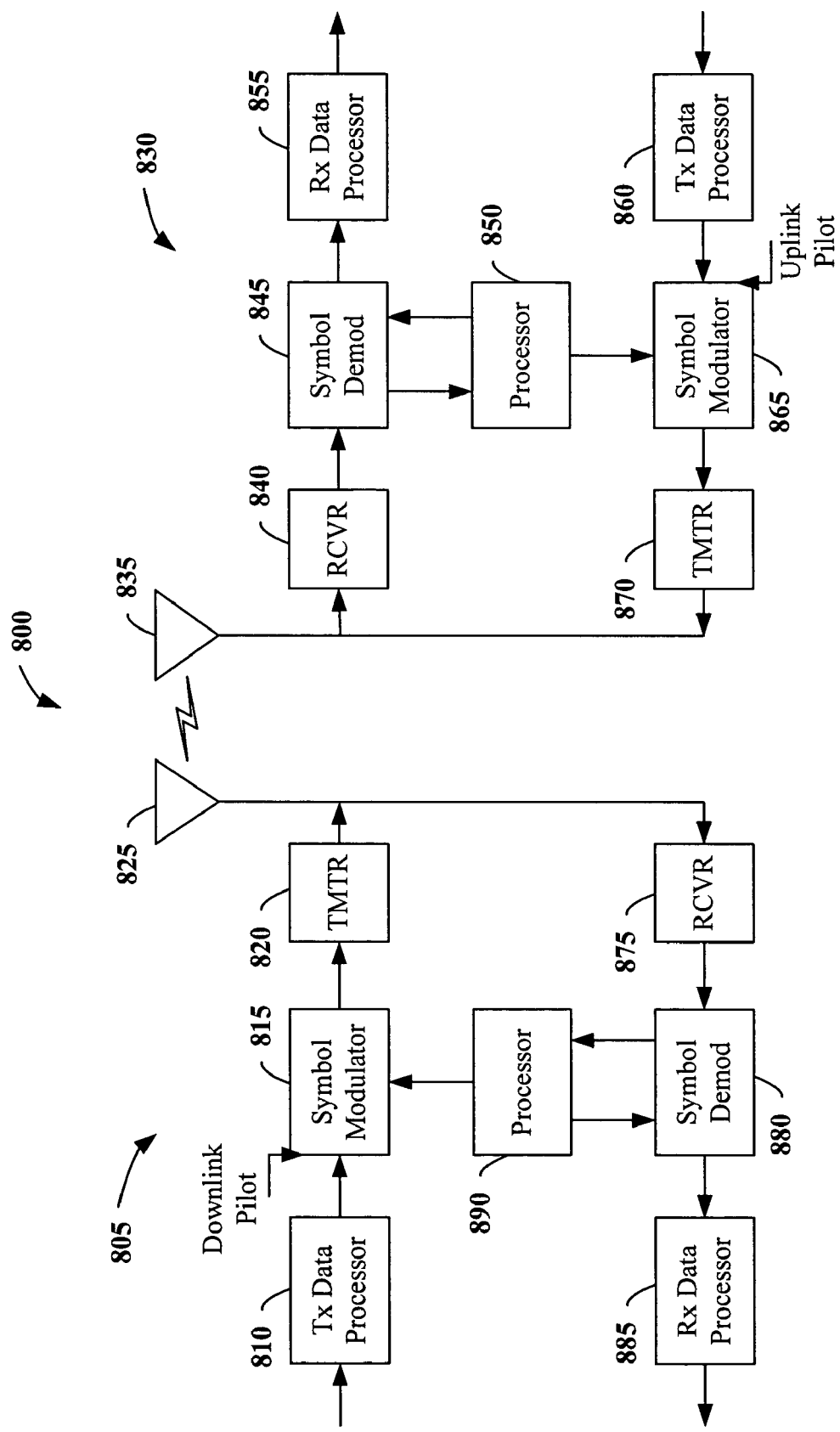
FIG. 8 is an illustration of a wireless network environment that can be employed in conjunction with the various systems and methods described herein.

FIG. 8 shows an exemplary wireless communication system 800. The wireless communication system 800 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems (FIGS. 1 and 3-4) and/or methods (FIGS. 5-7) described herein to facilitate wireless communication there between.

Referring now to FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and provides them to a transmitter unit (TMTR) 820. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 demodulates and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink. Multiple terminals may transmit pilot concurrently on the uplink on their respective assigned sets of pilot subbands, where the pilot subband sets may be interlaced.

Processors 890 and 850 direct (e.g., control, coordinate, manage, etc.) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
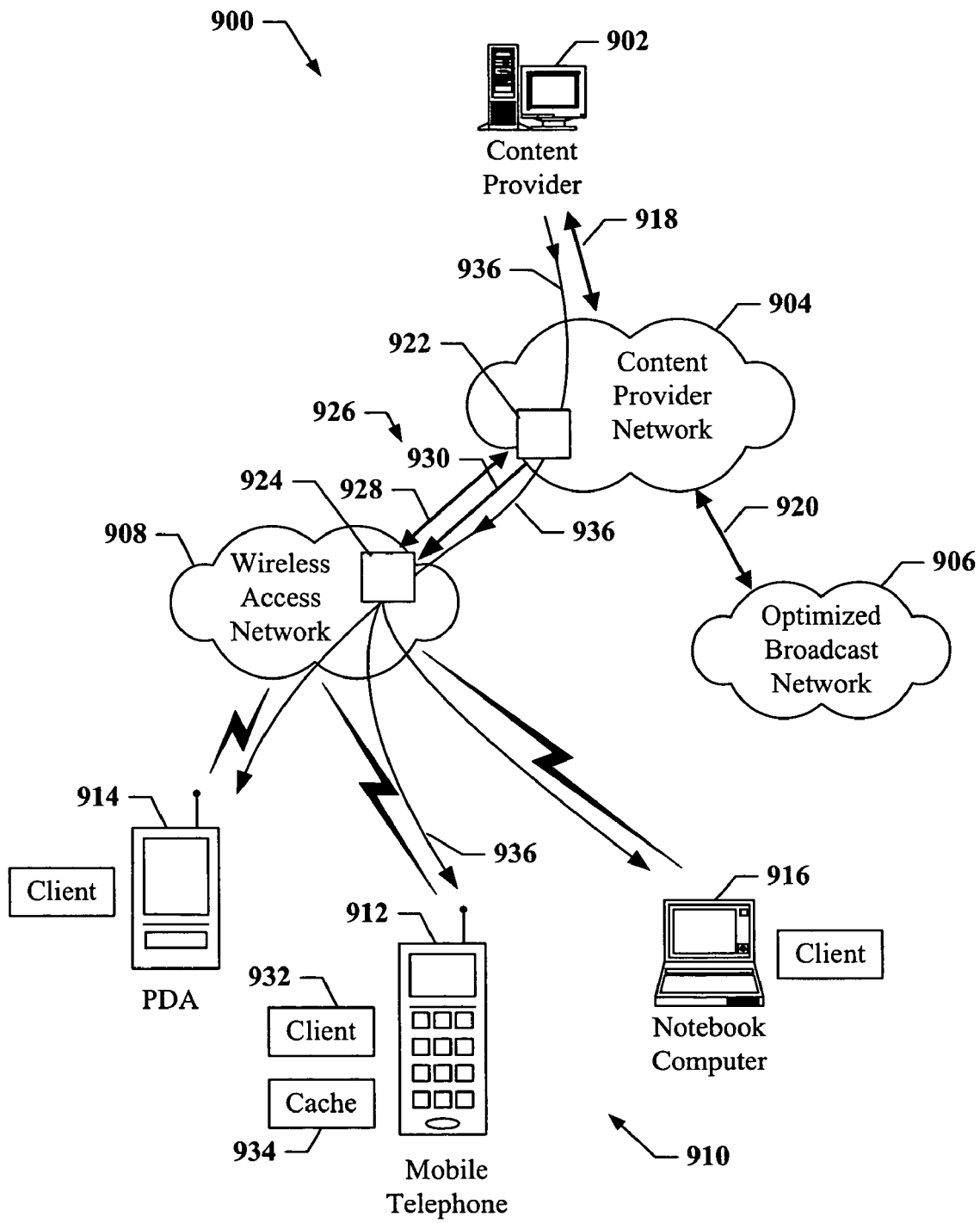
FIG. 9 is an illustration of a communication network that comprises an embodiment of a transport system that operates to create and transport multimedia content flows across data networks.

FIG. 9 shows an embodiment of a communication network 900 that comprises an embodiment of a transport system that operates to create and transport multimedia content flows across data networks. For example, the transport system is suitable for use in transporting content clips from a content provider network to a wireless access network for broadcast distribution.

Network 900 comprises a content provider (CP) 902, a content provider network 904, an optimized broadcast network 906, and a wireless access network 908. Network 900 also includes devices 910 that comprise a mobile telephone 912, a personal digital assistance (PDA) 914, and a notebook computer 916. Devices 910 illustrate just some of the devices that are suitable for use in one or more embodiments of the transport system. It should be noted that although three devices are shown in FIG. 9, virtually any number of devices, or types of devices are suitable for use in the transport system.

Content provider 902 operates to provide content for distribution to users in network 900. The content comprises video, audio, multimedia content, clips, real-time and non real-time content, scripts, programs, data or any other type of suitable content. Content provider 902 provides the content to content provider network 904 for distribution. For example, content provider 902 communicates with content provider network 904 via a communication link 918, which comprises any suitable type of wired and/or wireless communication link.

Content provider network 904 comprises any combination of wired and wireless networks that operate to distribute content for delivery to users. Content provider network 904 communicates with optimized broadcast network 906 via a link 920. Link 920 comprises any suitable type of wired and/or wireless communication link. Optimized broadcast network 906 comprises any combination of wired and wireless networks that are designed to broadcast high quality content. For example, optimized broadcast network 906 may be a specialized proprietary network that has been optimized to deliver high quality content to selected devices over a plurality of optimized communication channels.

In one or more embodiments, the transport system operates to deliver content from content provider 902 for distribution to a content server (CS) 922 at content provider network 904 that operates to communicate with a broadcast base station (BBS) 924 at wireless access network 908. CS 922 and BBS 924 communicate using one or more embodiments of a transport interface 926 that allows content provider network 904 to deliver content in the form of content flows to wireless access network 908 for broadcast/multicast to devices 910. Transport interface 926 comprises a control interface 928 and a bearer channel 930. Control interface 928 operates to allow CS 922 to add, change, cancel, or otherwise modify contents flows that flow from content provider network 904 to wireless access network 908. Bearer channel 930 operates to transport the content flows from content provider network 904 to wireless access network 908.

In one or more embodiments, CS 922 uses transport interface 926 to schedule a content flow to be transmitted to BBS 924 for broadcast/multicast over wireless access network 908. For example, the content flow may comprise a non real-time content clip that was provided by content provider 902 for distribution using content provider network 904. In an embodiment, CS 922 operates to negotiate with BBS 924 to determine one or more parameters associated with the content clip. Once BBS 924 receives the content clip, it broadcasts/multicasts the content clip over wireless access network 908 for reception by one or more devices 910. Any of devices 910 may be authorized to receive the content clip and cache it for later viewing by the device user.

For example, device 910 comprises a client program 932 that operates to provide a program guide that displays a listing of content that is scheduled for broadcast over wireless access network 908. The device user may then select to receive any particular content for rendering in real-time or to be stored in a cache 934 for later viewing. For example the content clip may be scheduled for broadcast during the evening hours, and device 912 operates to receive the broadcast and cache the content clip in cache 934 so that the device user may view the clip the next day. Typically, the content is broadcast as part of a subscription service and the receiving device may need to provide a key or otherwise authenticate itself to receive the broadcast.

In one or more embodiments, the transport system allows CS 922 to receive program-guide records, program contents, and other related information from content provider 902. CS 922 updates and/or creates content for delivery to devices 910.

Figure 10:
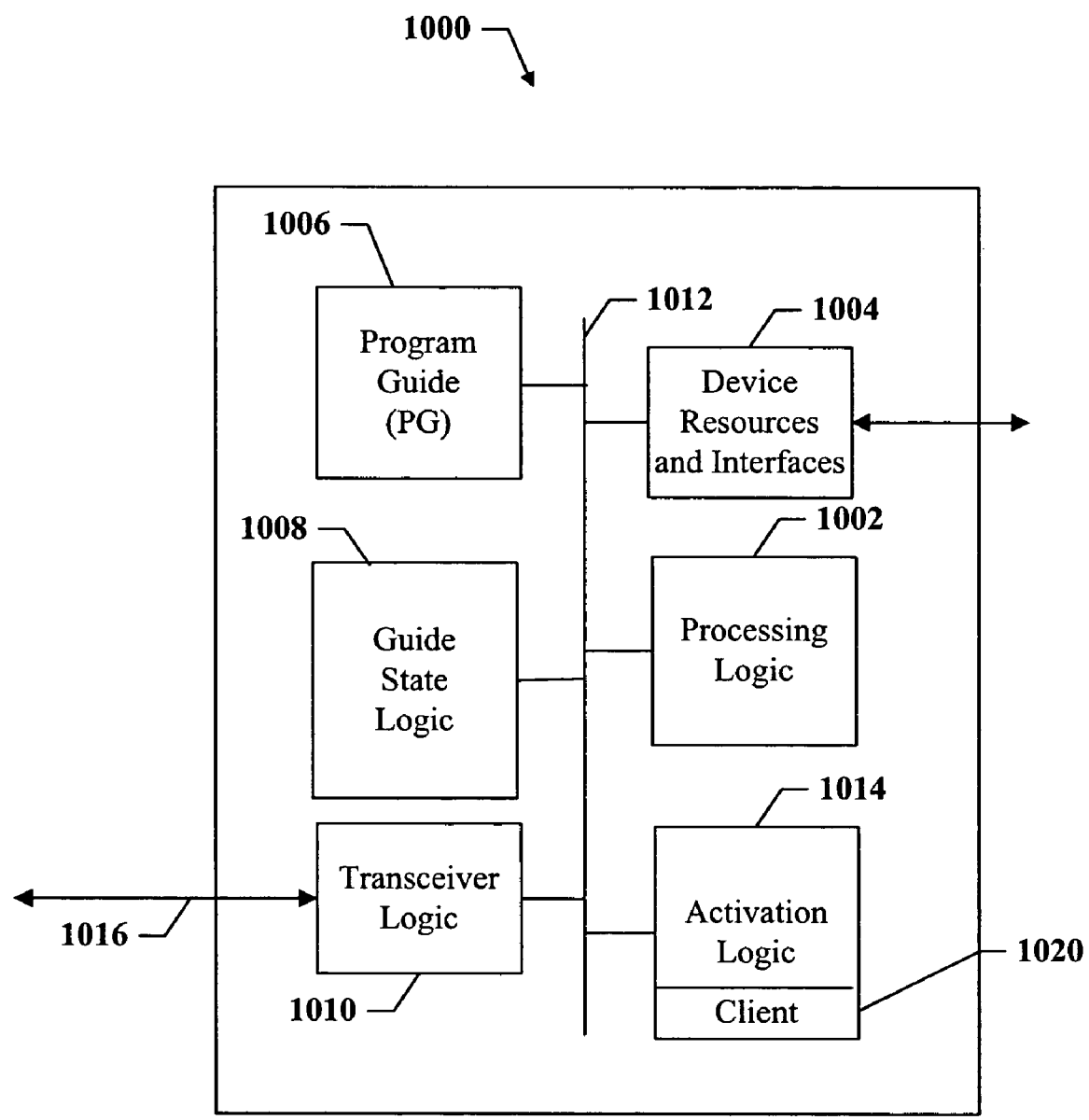
FIG. 10 is an illustration of a content provider server suitable for use in an embodiment of a content delivery system.

FIG. 10 shows an embodiment of a content provider server 1000 suitable for use in an embodiment of the content delivery system. For example, server 1000 may be used as the server 902 in FIG. 9. Server 1000 comprises processing logic 1002, resources and interfaces 1004, and transceiver logic 1010, all coupled to an internal data bus 1012. Server 1000 also comprises activation logic 1014, program guide (PG) 1006, and PG records logic 1008, which are also coupled to data bus 1012.

In one or more embodiments, processing logic 1002 comprises a CPU, processor, gate array, hardware logic, memory elements, virtual machine, software, and/or any combination of hardware and software. Thus, processing logic 1002 generally comprises logic to execute machine-readable instructions and to control one or more other functional elements of server 1000 via internal data bus 1012.

The resources and interfaces 1004 comprise hardware and/or software that allow server 1000 to communicate with internal and external systems. For example, the internal systems may include mass storage systems, memory, display driver, modem, or other internal device resources. The external systems may include user interface devices, printers, disk drives, or other local devices or systems.

Transceiver logic 1010 comprises hardware logic and/or software that operates to allow server 1000 to transmit and receive data and/or other information with remote devices or systems using communication channel 1016. For example, in an embodiment, communication channel 1016 comprises any suitable type of communication link to allow server 1000 to communicate with a data network.

Activation logic 1014 comprises a CPU, processor, gate array, hardware logic, memory elements, virtual machine, software, and/or any combination of hardware and software. Activation logic 1014 operates to activate a CS and/or a device to allow the CS and/or the device to select and receive content and/or services described in PG 1006. In one or more embodiments, activation logic 1014 transmits a client program 1020 to the CS and/or the device during the activation process. Client program 1020 runs on the CS and/or the device to receive PG 1006 and display information about available content or services to the device user. Thus, activation logic 1014 operates to authenticate a CS and/or a device, download client 1020, and download PG 1006 for rendering on the device by client 1020.

PG 1006 comprises information in any suitable format that describes content and/or services that are available for devices to receive. For example, PG 1006 may be stored in a local memory of server 1000 and may comprise information such as content or service identifiers, scheduling information, pricing, and/or any other type of relevant information. In an embodiment, PG 1006 comprises one or more identifiable sections that are updated by processing logic 1002 as changes are made to the available content or services.

PG record 1008 comprises hardware and/or software that operates to generate notification messages that identify and/or describe changes to PG 1006. For example, when processing logic 1002 updates PG 1006, PG records logic 1008 is notified about the changes. PG records logic 1008 then generates one or more notification messages that are transmitted to CSs, which may have been activated with server 1000, so that these CSs are promptly notified about the changes to PG 1006.

In an embodiment, as part of the content delivery notification message, a broadcast indicator is provided that indicates when a section of PG 1006 identified in the message will be broadcast. For example, in one embodiment, the broadcast indicator comprises one bit to indicate that the section will be broadcast and a time indicator that indicates when the broadcast will occur. Thus, the CSs and/or the devices wishing to update their local copy of the PG records can listen for the broadcast at the designated time to receive the updated section of the PG records.

In an embodiment, the content delivery notification system comprises program instructions stored on a computer-readable media, which when executed by a processor, for instance, processing logic 1002, provides the functions of server 1000 described herein. For example, the program instructions may be loaded into server 1000 from a computer-readable media, such as a floppy disk, CDROM, memory card, FLASH memory device, RAM, ROM, or any other type of memory device or computer-readable media that interfaces to server 1000 through resources 1004. In another embodiment, the instructions may be downloaded into server 1000 from an external device or network resource that interfaces to server 1000 through transceiver logic 1010. The program instructions, when executed by processing logic 1002, provide one or more embodiments of a guide state notification system as described herein.

Figure 11:
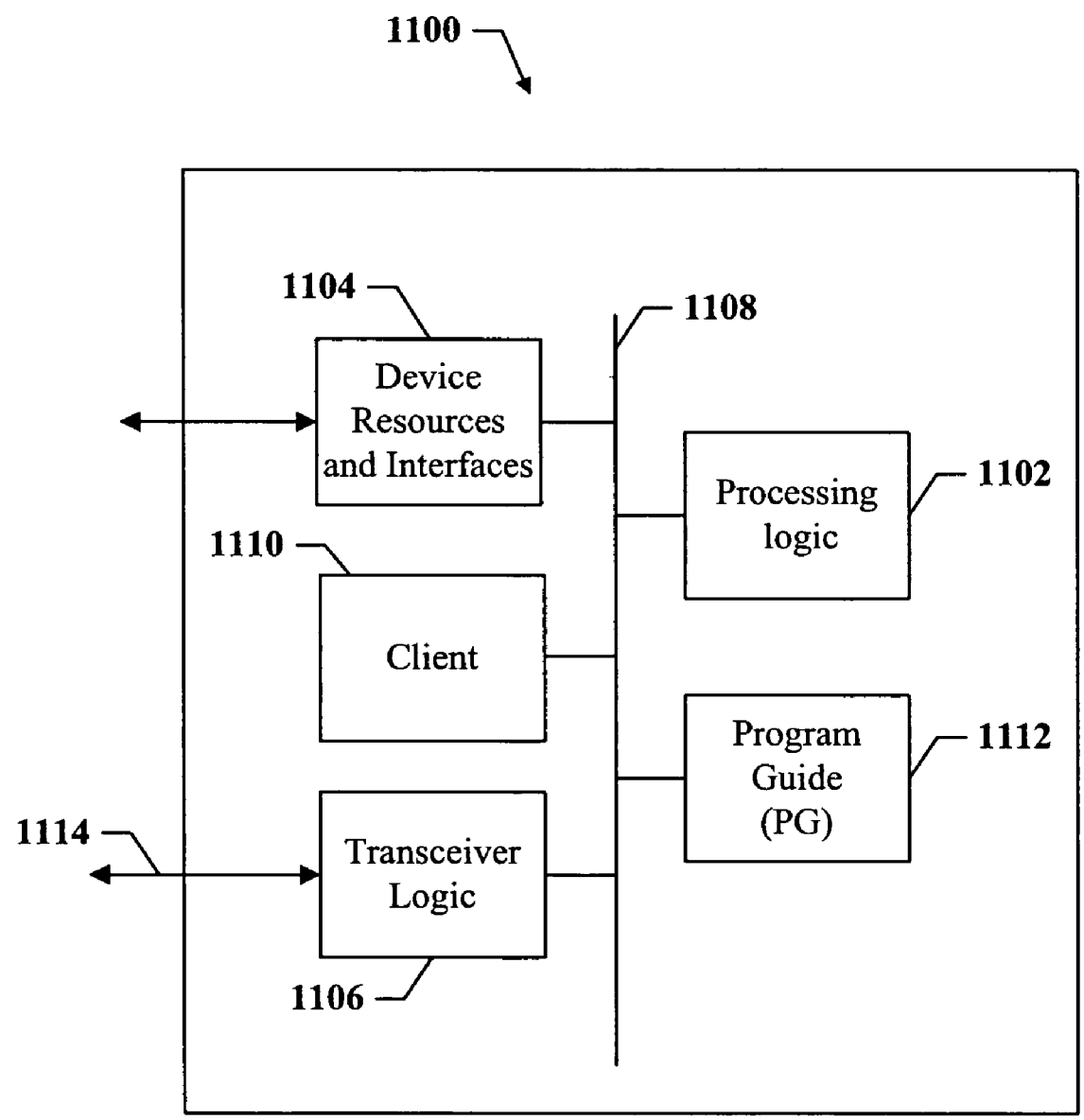
FIG. 11 is an illustration of a content server (CS) or device suitable for use in one or more embodiments of a content delivery system.

FIG. 11 shows an embodiment of a content server (CS) or device 1100 suitable for use in one or more embodiments of a content delivery system. For example, CS 1100 may be CS 922 or device 910 shown in FIG. 9. CS 1100 comprises processing logic 1102, resources and interfaces 1104, and transceiver logic 1106, all coupled to a data bus 1108. CS 1100 also comprises a client 1110, a program logic 1114 and a PG logic 1112, which are also coupled to data bus 1108.

In one or more embodiments, processing logic 1102 comprises a CPU, processor, gate array, hardware logic, memory elements, virtual machine, software, and/or any combination of hardware and software. Thus, processing logic 1102 generally comprises logic configured to execute machine-readable instructions and to control one or more other functional elements of CS 1100 via internal data bus 1108.

The resources and interfaces 1104 comprise hardware and/or software that allow CS 1100 to communicate with internal and external systems. For example, internal systems may include mass storage systems, memory, display driver, modem, or other internal device resources. The external systems may include user interface devices, printers, disk drives, or other local devices or systems.

Transceiver logic 1106 comprises hardware and/or software that operate to allow CS 1100 to transmit and receive data and/or other information with external devices or systems through communication channel 1114. For example, communication channel 1114 may comprise a network communication link, a wireless communication link, or any other type of communication link.

During operation, CS and/or device 1100 is activated so that it may receive available content or services over a data network. For example, in one or more embodiments, CS and/or device 1100 identifies itself to a content provider server during an activation process. As part of the activation process, CS and/or device 1100 receives and stores PG records by PG logic 1112. PG 1112 contains information that identifies content or services available for CS 1100 to receive. Client 1110 operates to render information in PG logic 1112 on CS and/or device 1100 using the resources and interfaces 1104. For example, client 1110 renders information in PG logic 1112 on a display screen that is part of the device. Client 1110 also receives user input through the resources and interfaces so that a device user may select content or services.

In an embodiment, CS 1100 receives notification messages through transceiver logic 1106. For example, the messages may be broadcast or unicast to CS 1100 and received by transceiver logic 1106. The PG notification messages identify updates to the PG records at PG logic 1112. In an embodiment, client 1110 processes the PG notification messages to determine whether the local copy at PG logic 1112 needs to be updated. For example, in one or more embodiments, the notification messages include a section identifier, start time, end time, and version number. CS 1100 operates to compare the information in the PG notification messages to locally stored information at the existing PG logic 1112. If CS 1100 determines from the PG notification messages that one or more sections of the local copy at PG logic 1112 needs to be updated, CS 1100 operates to receive the updated sections of the PG in one of several ways. For example, the updated sections of the PG may be broadcasted at a time indicated in the PG notification messages, so that transceiver logic 1106 may receive the broadcasts and pass the updated sections to CS 1100, which in turn updates the local copy at PG logic 1112.

In other embodiments, CS 1100 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

In one or more embodiments, CS 1100 performs one or more of the following functions in one or more embodiments of a PG notification system. It should be noted that the following functions might be changed, rearranged, modified, added to, deleted, or otherwise adjusted within the scope of the embodiments.

1. The CS is activated for operation with a content provider system to receive content or services. As part of the activation process, a client and PG are transmitted to the CS.
2. One or more PG notification messages are received by the CS and used to determine if one or more sections of the locally stored PG need to be updated.
3. In an embodiment, if the CS determines that one or more sections of the locally stored PG need to be updated, the CS listens to a broadcast from the distribution system to obtain the updated sections of the PG that it needs to update its local copy.
4. In other embodiments, the CS transmits one or more request messages to the CP to obtain the updated sections of the PG it needs.
5. In response to the request, the CP transmits the updated sections of the PG to the CS.
6. The CS uses the received updated sections of the PG to update its local copy of the PG.

In one or more embodiments, the content delivery system comprises program instructions stored on a computer-readable media, which when executed by a processor, such as processing logic 1102, provides the functions of the content delivery notification system as described herein. For example, instructions may be loaded into CS 1100 from a computer-readable media, such as a floppy disk, CDROM, memory card, FLASH memory device, RAM, ROM, or any other type of memory device or computer-readable media that interfaces to CS 1100 through the resources and interfaces 1104. In other embodiments, the instructions may be downloaded into CS 1100 from a network resource that interfaces to CS 1100 through transceiver logic 1106. The instructions, when executed by processing logic 1102, provide one or more embodiments of a content delivery system as described herein.

It should be noted that CS 1100 represents just one implementation and that other implementations are possible within the scope of the embodiments.

Figure 12:
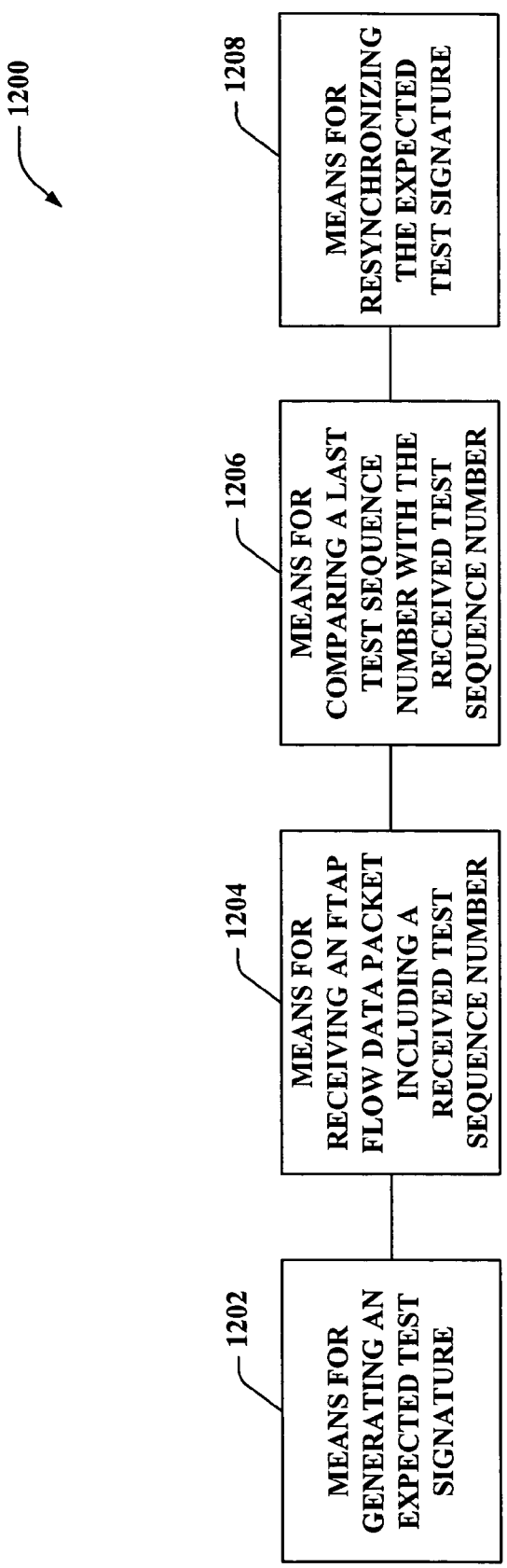
FIG. 12 is an illustration of a system that facilitates verifying correctness of received FTAP data packets.

With reference to FIG. 12, illustrated is a system 1200 that facilitates verifying correctness of received FTAP data packets. It is to be appreciated that system 1200 is represented as including functional blocks, which can be functional blocks that represent functions implemented by a processor, software, or combination thereof (e.g., firmware). System 1200 can be implemented in a wireless device and can include means for generating an expected test signature 1202. Further, system 1200 may comprise means for receiving an FTAP flow data packet including a received test sequence number 1204. Pursuant to an illustration, the FTAP flow data packet may also include data associated with a test signature generated at a remote location (e.g., FTAS). Moreover, system 1200 may include means for comparing a last test sequence number with the received test sequence number 1206. Additionally, system 1200 may include means for resynchronizing the expected test signature 1208. For instance, the resynchronization may be based at least in part upon the comparison of test sequence numbers.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates verifying correctness of received FLO test application protocol (FTAP) flow data packets at a client, comprising:
   generating an expected test signature based upon a start sequence number and a start signature offset;
   obtaining a flow data packet from a network server including a received test signature and corresponding sequence number;
   comparing the received sequence number and a retained sequence number; and
   resynchronizing the expected test signature at the client if the received sequence number and the retained sequence number are not equivalent.

2. The method of claim 1, wherein the retained sequence number corresponds to a previously received sequence number.

3. The method of claim 1, wherein comparing the received sequence number and the retained sequence number comprises determining whether the received sequence number is equivalent to the retained sequence number that has been incremented.

4. The method of claim 3, wherein resynchronizing the expected test signature comprises incrementing a most recently received test signature and retaining the incremented value within a signature buffer.

5. The method of claim 1, wherein comparing the received sequence number and the retained sequence number comprises determining whether the received sequence number is equivalent to the retained sequence number.

6. The method of claim 5, wherein resynchronizing the expected test signature comprises assigning the expected test signature with a value that corresponds to a most recently received test signature.

7. The method of claim 1, wherein comparing the received sequence number and the retained sequence number comprises determining that the received sequence number is less than the retained sequence number.

8. The method of claim 7, wherein resynchronizing the expected test signature comprises adding a wraparound value to the received sequence number and subtracting the retained sequence value therefrom to create a skip value.

9. The method of claim 8, wherein the wraparound value is $2^{32}$.

10. The method of claim 8, wherein resynchronizing the expected test signature comprises skipping a number of signals with respect to the generated expected test signature by the skip value.

11. The method of claim 1, wherein comparing the received sequence number and the retained sequence number comprises determining that the received sequence number is greater than the retained sequence number once incremented.

12. The method of claim 11, wherein resynchronizing the expected test signature comprises subtracting the retained sequence number from the received sequence number to create a skip value.

13. The method of claim 12, wherein resynchronizing the expected test signature comprises skipping a number of signals with respect to the generated expected test signature by the skip value.

14. The method of claim 1, wherein the expected test signature is an 8 bit value.

15. The method of claim 1, wherein the start sequence number and the start signature offset correlate sequence numbers with test signatures irrespective of time.

16. The method of claim 1, wherein the start sequence number and the start signature offset are known both to a server that issues an initial packet and a client that receives the initial packet.

17. The method of claim 1, wherein the flow data packet comprises an FTAP flow data packet.

18. The method of claim 17, wherein the FTAP flow data packet is provided from a server to a client by way of OFDM.

19. The method of claim 1, where the received test signature is derived from a circular buffer of bits that is generated through the following polynomial and a 15-state Simple Shift Register Generator:

$$P(x)=x^{15}+x+1.$$

20. The method of claim 1, wherein comparing the received sequence number and the retained sequence number and resynchronizing the expected test signature based upon the comparison of the received sequence number and the retained sequence number occurs at a mobile device.

21. The method of claim 20, wherein the mobile device is a portable telephone.

22. The method of claim 21, wherein the portable telephone reports errors determined with respect to the comparison to a server over one of a 2G link and a 3G link.

23. The method of claim 1, further comprising utilizing the resynchronized expected test signature in connection with providing streaming content to a mobile device.

24. The method of claim 1, wherein the start sequence number and the start signature offset are hard coded into a client device.

25. A wireless communications apparatus, comprising:
   a memory that retains a test sequence number received from a network server and an expected test signature corresponding to the retained test sequence number; and
   a processor that compares the retained test sequence number with a received test sequence number from the network server and resynchronizes the expected test signature at the wireless communications apparatus if the retained test sequence number and the received test sequence number are not equivalent.

26. The wireless communications apparatus of claim 25, wherein the processor replaces the retained test sequence number in memory with the received test sequence number.

27. The wireless communications apparatus of claim 25, wherein the memory comprises logic utilized by the processor to effectuate resynchronization.

28. The wireless communications apparatus of claim 25, wherein the processor increments the retained test sequence number and compares the incremented retained test sequence number with the received test sequence number to determine whether the incremented retained test sequence number and the received test sequence number are equivalent.

29. The wireless communications apparatus of claim 28, wherein the processor increments the expected test signature upon determining equivalence between the incremented retained test sequence number and the received test sequence number.

30. The wireless communications apparatus of claim 25, wherein the processor compares the retained test sequence number and the received test sequence number and determines equivalence therebetween.

31. The wireless communications apparatus of claim 30, wherein the processor assigns a value with respect to the expected test signature that matches a most recently received test signature.

32. The wireless communications apparatus of claim 25, wherein the processor determines that the received test sequence number is less than the retained test sequence number and determines a skip value that is a function of a wraparound value.

33. The wireless communications apparatus of claim 32, wherein the wraparound value is $2^{32}$.

34. The wireless communications apparatus of claim 32, wherein the processor increments the expected test signature by the determined skip value.

35. The wireless communications apparatus of claim 25, wherein the processor increments the retained test sequence number and determines that the received test sequence number is greater than the incremented retained test sequence number and determines a skip value that is a function of a difference between the received test sequence number and the incremented retained test sequence number.

36. The wireless communications apparatus of claim 35, wherein the processor increments the expected test signature by the determined skip value.

37. The apparatus of claim 25, wherein the retained sequence number corresponds to a previously received sequence number.

38. The apparatus of claim 25, wherein the processor adds a wraparound value to the received sequence number and subtracts the retained sequence value therefrom to create a skip value.

39. The apparatus of claim 38, wherein the wraparound value is $2^{32}$.

40. The apparatus of claim 38, wherein the processor skips a number of signals with respect to the generated expected test signature by the skip value.

41. The apparatus of claim 25, wherein a start sequence number and a start signature offset are known both to a server that issues an initial packet and the apparatus that receives the initial packet.

42. The apparatus of claim 25, where the received test signature is derived from a circular buffer of bits that is generated through the following polynomial and a 15-state Simple Shift Register Generator:

$P(x)=x^{15}+x+1$.

43. A computer-readable medium having stored thereon computer-executable instructions for:
receiving a test sequence number that correlates to a test signature;
determining whether the test signature that correlates to the received test sequence number corresponds to an expected test signature; and
resynchronizing the expected test signature if the expected test signature and the received test signature do not correspond.

44. The computer-readable medium of claim 43, the computer-executable instructions further comprise:
comparing whether the received test sequence number is equivalent to a single increment of a previously received test sequence number; and
determining whether the test signature that correlates to the received test sequence number corresponds to an expected test signature based at least in part upon the comparison.

45. The computer-readable medium of claim 43, wherein the received test sequence number is a 32 bit integer.

46. The computer-readable medium of claim 43, being embedded within a portable device.

47. The computer-readable medium of claim 46, the portable device being a portable telephone.

48. The computer-readable medium of claim 43, the received test sequence number and the corresponding test signature are received within an FTAP flow data packet.

49. The computer-readable medium of claim 43, wherein the expected test signature corresponds to a previously received sequence number.

50. The computer-readable medium of claim 49, wherein determining whether the test signature that correlates to the received test sequence number corresponds to the expected test signature comprises determining whether the received sequence number is equivalent to the previously received sequence number that has been incremented.

51. The computer-readable medium of claim 50, wherein resynchronizing the expected test signature comprises incrementing the test signature and retaining the incremented value within a signature buffer.

52. The computer-readable medium of claim 49, further comprising determining that the received sequence number is less than the previously received sequence number.

53. The computer-readable medium of claim 52, wherein resynchronizing the expected test signature comprises adding a wraparound value to the received sequence number and subtracting the previously received sequence value therefrom to create a skip value.

54. The computer-readable medium of claim 53, wherein the wraparound value is $2^{32}$.

55. The computer-readable medium of claim 53, wherein resynchronizing the expected test signature comprises skipping a number of signals with respect to the generated expected test signature by the skip value.

56. The computer-readable medium of claim 43, wherein a start sequence number and a start signature offset are known both to a server that issues an initial packet and a client that receives the initial packet.

57. The computer-readable medium of claim 43, where the received test signature is derived from a circular buffer of bits that is generated through the following polynomial and a 15-state Simple Shift Register Generator:

$$P(x)=x^{15}+x+1.$$

58. A wireless communications apparatus, comprising:
means for generating an expected test signature based upon a start sequence number and a start signature offset;
means for obtaining flow data from a network server including a received test signature and corresponding sequence number;
means for comparing the received sequence number and a retained sequence number; and
means for resynchronizing the expected test signature at the wireless communications apparatus if the received sequence number and the retained sequence number are not equivalent.

59. The wireless communications apparatus of claim 58, wherein the start sequence number and the start signature offset correlate sequence numbers with test signatures irrespective of time.

60. The wireless communications apparatus of claim 58, wherein the received sequence number and the retained sequence number are 32 bit integers.

61. The wireless communications apparatus of claim 58, wherein a client device comprises the means for comparing the received sequence number and the retained sequence number and the means for resynchronizing the expected test signature based upon the comparison of the received sequence number and the retained sequence number.

62. The wireless communications apparatus of claim 61, wherein the client device is a portable telephone.

63. The wireless communication apparatus of claim 58, wherein the retained sequence number corresponds to a previously received sequence number.

64. The wireless communication apparatus of claim 58, wherein comparing the received sequence number and the retained sequence number comprises determining whether the received sequence number is equivalent to the retained sequence number that has been incremented.

65. The wireless communication apparatus of claim 64, wherein resynchronizing the expected test signature comprises means for incrementing a most recently received test signature and retaining the incremented value within a signature buffer.

66. The wireless communication apparatus of claim 58, wherein comparing the received sequence number and the retained sequence number comprises means for determining that the received sequence number is less than the retained sequence number.

67. The wireless communication apparatus of claim 66, wherein resynchronizing the expected test signature comprises means for adding a wraparound value to the received sequence number and subtracting the retained sequence value therefrom to create a skip value.

68. The wireless communication apparatus of claim 67, wherein the wraparound value is $2^{32}$.

69. The wireless communication apparatus of claim 67, wherein resynchronizing the expected test signature comprises means for skipping a number of signals with respect to the generated expected test signature by the skip value.

70. The wireless communication apparatus of claim 58, wherein the start sequence number and the start signature offset are known both to a server that issues an initial packet and the wireless communication apparatus.

71. The wireless communication apparatus of claim 58, where the received test signature is derived from a circular buffer of bits that is generated through the following polynomial and a 15-state Simple Shift Register Generator:

$$P(x)=x^{15}+x+1.$$

72. A processor in a device comprising:
logic configured to:
compare a received test sequence number within an FTAP flow data packet with a retained test sequence number from a previously received FTAP flow data packet, wherein the received test sequence number and the retained test sequence number correspond to test signatures; and
resynchronize an expected test signature at the device if the received test sequence number and the retained test sequence number are not equivalent.

73. The processor of claim 72, the device is a portable telephone.

74. The processor of claim 72, the received test sequence number and the retained test sequence number are based at least in part upon a known start test sequence number.

* * * * *